Nov. 25, 1952  R. E. SCHWARY  2,619,199
SHOCK ABSORBER
Filed Oct. 14, 1950
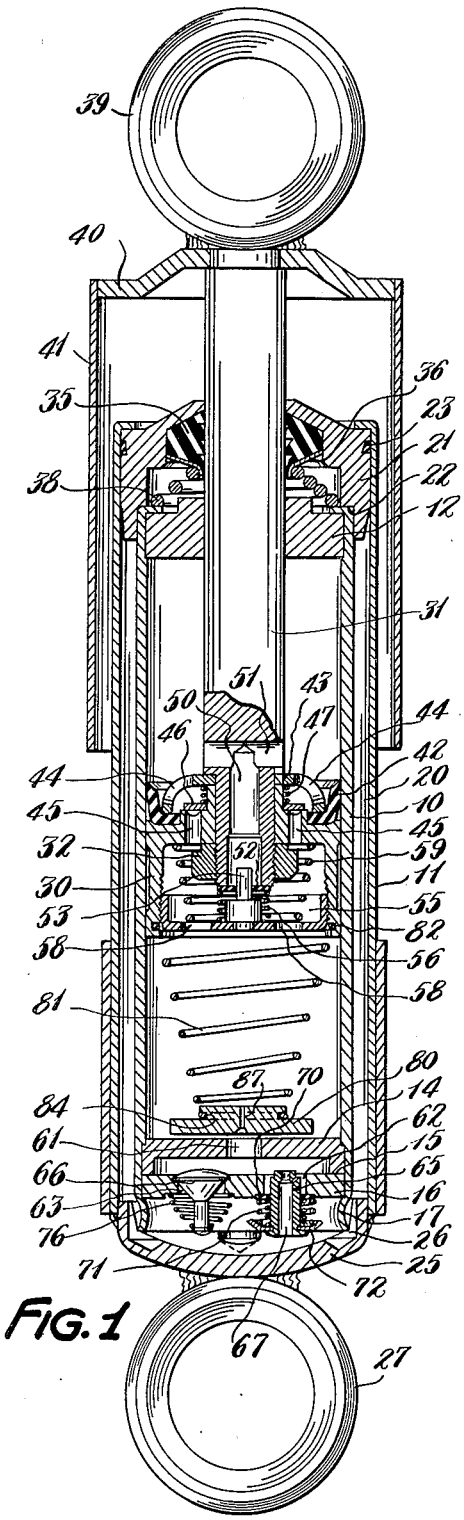
Fig. 1
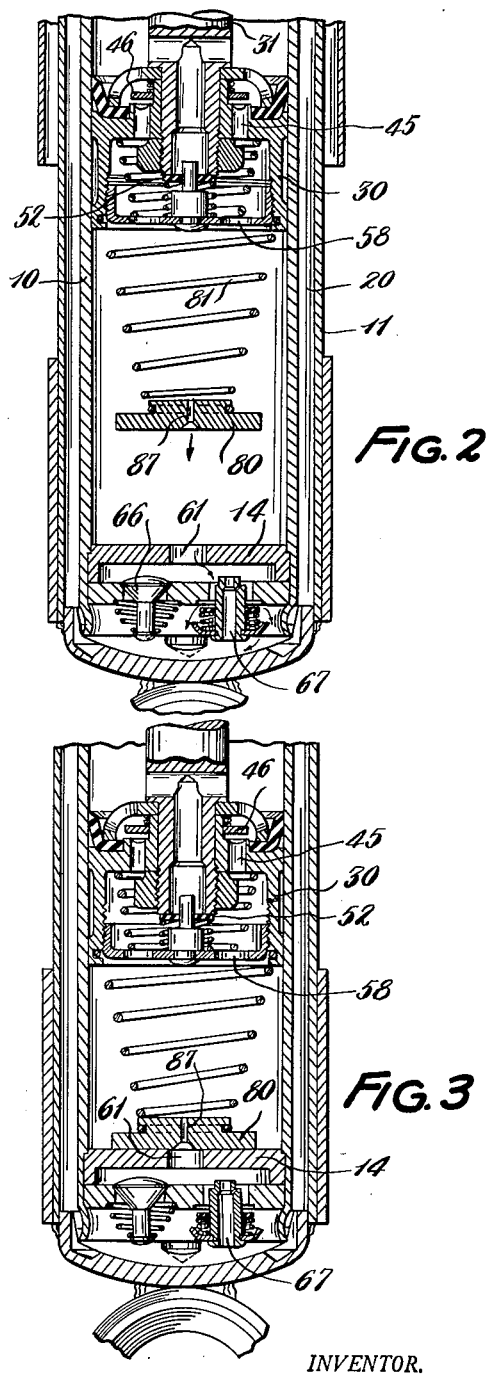
Fig. 2
Fig. 3
INVENTOR.
ROBERT E. SCHWARY
BY Hudson, Boughton,
Williams, David & Hoffmann
ATTORNEYS Patented Nov. 25, 1952

2,619,199

UNITED STATES PATENT OFFICE 2,619,199

SHOCK ABSORBER

Robert E. Schwary, Euclid, Ohio, assignor to The Gabriel Company, Cleveland, Ohio, a corporation of Ohio Application October 14, 1950, Serial No. 190,168

3 Claims. (Cl. 188—88)

The present invention relates to hydraulic shock absorbers, and more particularly to hydraulic shock absorbers of the type having a piston reciprocable in a working cylinder communicating with a liquid reservoir.

Shock absorbers for sprung verhicles are attached to the vehicles in such a manner as to resist movement between the vehicle chassis and the axles thereof to provide a "soft" or easy ride of the chassis. If the resistance offered by the shock absorber to normal or average road shocks is such to provide the most satisfactory ride under these conditions, severe road shocks will then cause the axle and chassis to strike one another or "bottom." On the other hand, if the resistance of the shock absorbers is such as to prevent "bottoming" under severe road shocks, a relatively rough ride results when the road shocks are relatively light or normal. An object of the present invention is the provision of a shock absorber having two stages of resistance, one stage providing moderate resistance under normal or average road shocks and the other stage offering a substantially increased resistance under severe road shocks, particularly to movement of the axle and chassis toward one another to minimize or substantially prevent "bottoming."

A more specific object of the present invention is the provision of an hydraulic shock absorber having a piston reciprocable in a working cylinder communicating with a liquid reservoir, which piston carries a valve member spaced from the piston and adapted to substantially close the liquid passageway from the cylinder to the reservoir as the piston approaches one end of its stroke, thereby materially increasing the resistance to the movement of the piston in the cylinder.

Other obiects and advantages of the invention will be apparent from the following description of the preferred form of the invention, reference being had to the accompanying drawing wherein:

Fig. 1 is a longitudinal sectional view of a direct double acting hydraulic shock absorber embodying the invention;

Fig. 2 is a fragmentary sectional view of the shock absorber shown in Fig. 1 showing the piston and its associated parts in a different position; and Fig. 3 is a view similar to Fig. 2 but showing certain parts in still different positions.

The invention contemplates the provision of an hydraulic shock absorber particularly suitable for automotive vehicles, which shock absorber comprises a liquid containing cylinder and a piston reciprocable in the cylinder and connected with the vehicle in such a manner that the piston reciprocates in the cylinder as the axle moves relative to the chassis, and vice versa. The cylinder is in communication with a liquid reservoir through one or more passageways so that liquid flows to and from the cylinder as the piston reciprocates therein, and preferably valves are provided in the passageways to more or less restrict the flow of liquid to and from the cylinder to thereby dampen the movement of the piston. In the preferred form of the invention, spring pressed valves are provided through which the liquid flows to and from the cylinder, and the liquid passageway includes an opening through a wall member adjacent to one end of the cylinder and the piston carries a valve plate which is adapted to cover the opening after the piston has moved through a predetermined stroke relative to the cylinder and thereby substantially cut off or materially restrict the passage of liquid from the cylinder to the reservoir whereby the liquid trapped in the cyinder materially increases the resistance to travel of the piston toward the end of the stroke. The valve plate carried by the piston is positioned relative to the piston so that it is ineffective during normal or average strokes of the piston.

Although the invention may be embodied in various forms of shock absorbers, it is herein shown as embodied in a direct acting hydraulic shock absorber for automotive vehicles and it comprises a liquid containing cylinder 10 within an outer cylindrical housing 11. The cylinder 10 is closed at its upper end by a disk or head 12, one side of which abuts a shoulder formed adjacent to the upper end of the cylinder and which head is suitably held in place as by spinning the outer end portion of the cylinder against the outer side thereof. The cylinder 10 has an annular shoulder formed inwardly from the lower end thereof against which a wall member or plate 14 is positioned. The plate 14 has an outwardly projecting flange 15 against which a disk 16 is positioned and the end portion of the cylinder 10 is crowded inwardly as at 17 to secure the disk 16 and plate 14 in place. The plate 14 is preferably welded to the cylinder to firmly secure it in place.

The housing 11 cooperates with the cylinder 10 to form a liquid reservoir 20, and the upper end of the housing is fixed relative to the cylinder by a cup shaped member 21 having an internal shoulder 22 which rests against the upper end of the cylinder and the upper end of the housing is spun inwardly against the member 21 to hold it to the cylinder. Preferably, a gasket 23 encircles the member 21 and forms a seal between the member and the housing. The lower end of the housing 11 has an end cap 25 welded therein, which cap has a plurality of grooves 26 which form passages leading from the lower end of the cylinder 10 to the reservoir 20 between the cylinder and housing. The end cap 25 has an eye 27 welded thereto by which the lower end of the shock absorber can be attached to any suitable part of the vehicle, such as the axle. The lower end of the cylinder 10 engages the inside of the cap 25 to center it in the housing 11.

An inverted cup shaped piston 30 reciprocates within the cylinder 10 and is attached to a piston rod 31 which projects through openings through disk 12 and member 21. In the form shown, the piston has a central opening through which a neck portion of the piston rod 31 extends, which neck portion is threaded and receives a nut 32 to secure the piston to the rod. As mentioned, the member 21 has an opening therethrough, and to prevent leakage of liquid between the piston rod and the opening walls, a suitable resilient packing ring 35 surrounds the piston rod 31 and is retained under compression in a recess in the member 21 by a conical shaped washer 36 which is pressed to the underside of the packing ring 35 by a spring 38.

The upper end of the piston rod has an eye 39 welded thereon by which it may be connected to the chassis of the vehicle, for example. Preferably, a dust cover is attached to the piston rod, which cover comprises a plate 40 having a cylindrical skirt 41 depending therefrom and surrounding the upper portion of the housing 11.

Preferably, a sealing gasket 42 is attached to the upper side of the piston by a dish shaped member 43 clamped to the piston rod between the piston and the shoulder formed at the base of the neck portion of the piston rod which extends through the piston. The member 43 has a plurality of openings 44 through which liquid may pass.

The piston 30 has a plurality of liquid passages 45 formed therethrough which are adapted to be closed by a suitable annular valve member 46 normally urged by a coil spring 47 to close the top ends of the passages 45. Preferably, a bleed opening, not shown, is provided through valve member 46 to permit the piston to be reciprocated manually prior to installation of the shock absorber on a vehicle. It will be seen that when the piston moves upwardly relative to the cylinder, which occurs during the rebound stroke, the liquid passages 45 are closed by the valve 46, but when the piston moves in the opposite direction, or on impact, liquid pressure on the underside of the valve 46 lifts the valve to permit the passage of liquid into the upper side of the piston through the passages 45.

A passage is provided for the flow of liquid from above the piston 30 to the underside thereof by a bore 50 in the lower end of the piston rod 31, which bore is intersected by a cross-bore 51 above the piston. The lower end of bore 50 is adapted to be closed by a suitable valve 52 which slides on a pin 53 attached to an end member 55 threaded into the piston, as shown. The valve 52 is normally urged to closed position by a coil spring 56, but on the rebound stroke the liquid pressure in the bore 50 depresses the valve 52 to permit passage of liquid from above to below the piston. The member 55 has a plurality of openings 58 through which the liquid may pass into the lower portion of the cylinder 10. Preferably, a coil spring 59 is provided for preventing the member 55 from becoming unthreaded from the piston.

It will be seen that the valves 46, 52 restrict the flow of liquid from one side of the piston to the other to a certain extent which restricts the reciprocation of the piston in the cylinder. As is well understood by those familiar with the art, during the compression or impact stroke, the piston rod 31 displaces liquid from the cylinder 10 which enters the reservoir 20. The liquid passageway between the reservoir 20 and cylinder 10 includes a central opening 61 in plate 14 and openings 63, 62 through the disk 16. The opening 62 has a valve 65 therein and opening 63 has a valve 66 therein. The valve 65 comprises a tubular stem 67 having a restricted portion at the upper end and which is supported in the opening 62 by lugs thereon, not shown. A valve plate 70, which is formed of any suitable composition, is normally urged to close the opening 62 by coil springs 71, the lower ends of which are seated in a dish-shaped washer 72 attached to the lower end of the stem 67. The increase in liquid pressure above the plate 16 due to the piston rod entering the cylinder 10 forces valve 70 downwardly against the pressure of springs 71 to provide a more or less restricted passage of liquid from the cylinder to the reservoir.

The valve 66 comprises a mushroom shaped valve member adapted to close the opening 63, which member is adapted to be normally closed by a coil spring 76 but which valve may be opened by a reduction in pressure above the plate 16 as during the rebound stroke of the piston 30 so that the valve permits a more or less restricted passage of liquid from the reservoir to the lowermost portion of the cylinder.

The resistance to the flow of liquid through the valve 65, is determined so that the resistance to the movement of piston 30 in the cylinder provides a "soft" ride under normal or average road shocks but which resistance is inadequate to prevent "bottoming" in the event severe road shocks are encountered.

According to the present invention, a second stage of resistance to movement of the piston in its impact stroke is brought about near the limit of the impact stroke by substantially limiting the passage of liquid from the interior of the cylinder 10 to the reservoir 20. In the embodiment of the invention shown, the piston 30 yieldingly carries a stop button or valve plate 80 thereon by means of a coil spring 81 having one end located in an annular groove 82 in the piston and the opposite end of the spring encircles a neck portion 84 of the valve plate. By this arrangement, the valve plate 80 is yieldingly carried a predetermined distance from the piston 30 and is adapted to engage the disk 14 and substantially close the opening 61 therethrough when the piston 30 moves within a predetermined distance from the lower end of the cylinder 10 during the impact stroke. Preferably, the valve plate 80 has a bleed passage 87 therethrough which is adapted to register with opening 61 through the plate 14 when the valve plate 80 engages the plate 14. The length of the spring 81 is such that plate 80 does not engage plate 14 during impact strokes occasioned by normal or average road shocks, but the valve plate 80 is effective only after the impact stroke of piston 30 exceeds that considered normal.

By this construction on the average or normal impact strokes of the shock absorber, the piston moves under normal restraint toward the lower end of the cylinder. If the impact is severe and causes the piston to exceed its normal travel, valve plate 80 engages plate 14, as seen in Fig. 3, and substantially closes off passage 61 thereby trapping liquid between the piston and the plate 14 which provides a substantial increase to further impact movement of the piston, thereby minimizing the tendency of the chassis and axle to strike one another or "bottom."

It will be apparent that the objects and advantages of the invention enumerated, as well as others have been achieved and that applicant has provided an efficient, relatively inexpensive construction in an hydraulic shock absorber which provides a second stage of resistance during a portion of the stroke of the shock absorber piston, and while the preferred form of the invention has been shown and described, it will be understood that other forms can be adopted all falling within the scope of the claims which follow.

Having thus described my invention, I claim:

1. In an hydraulic shock absorber comprising a cylinder having a liquid reservoir in communication with one end thereof and a piston reciprocable in the cylinder, the improvement which comprises an end plate in said cylinder adjacent to said one end thereof and having an opening therethrough forming a passage between the cylinder and reservoir, a pressure responsive impact valve in said opening operative to control the flow of liquid from the cylinder to the reservoir, a second plate in the cylinder spaced inwardly relative to the first-mentioned plate and having an opening therethrough through which liquid moving to and from the cylinder and reservoir is directed, and a valve member normally spaced from the second-mentioned plate and movable in response to predetermined movement of the piston to substantially close said opening in the second-mentioned plate.

2. In an hydraulic shock absorber comprising a cylinder having a liquid reservoir in communication with one end thereof and a piston reciprocable in the cylinder, the improvement which comprises an end plate in the cylinder adjacent to said one end thereof and having an opening therethrough forming a passage between the cylinder and reservoir, a pressure responsive impact valve in said opening operative to control the flow of liquid from the cylinder to the reservoir, a second plate in the cylinder spaced inwardly of the cylinder relative to the first-mentioned plate and having an opening therethrough through which liquid moving to and from the cylinder and reservoir is directed, a valve plate normally spaced from the second-mentioned plate and movable in response to predetermined movement of the piston into engagement with the second-mentioned plate to substantially close said opening in the second-mentioned plate, and means yieldingly connecting said valve plate to said piston.

3. In an hydraulic shock absorber comprising a cylinder having a liquid reservoir in communication with one end thereof and a piston reciprocable in the cylinder, the improvement which comprises an end plate in the cylinder adjacent to said one end thereof and having an opening therethrough forming a passage between the cylinder and reservoir, a pressure responsive impact valve in said opening operative to control the flow of liquid from the cylinder to the reservoir, a second plate in the cylinder spaced inwardly of the cylinder relative to the first-mentioned plate and having an opening therethrough through which liquid moving to and from the cylinder and reservoir is directed, a valve plate normally spaced from the second-mentioned plate and movable into engagement with said second-mentioned plate to substantially close said opening in the latter plate, and a coil spring attached at one end to the piston and carrying said valve plate on the other end thereof.

ROBERT E. SCHWARY.

REFERENCES CITED

The following references are of record in the file of this patent:

UNITED STATES PATENTS

| Number | Name | Date |
| --- | --- | --- |
| 2,379,750 | Rossman | July 3, 1945 |
| 2,395,027 | Whisler | Feb. 19, 1946 |
| 2,411,667 | Mowrey | Nov. 26, 1946 |
| 2,465,680 | Focht | Mar. 29, 1949 |